(No Model.) 2 Sheets—Sheet 1.
F. L. FULLER.
PRICE SCALE.
No. 602,658. Patented Apr. 19, 1898.
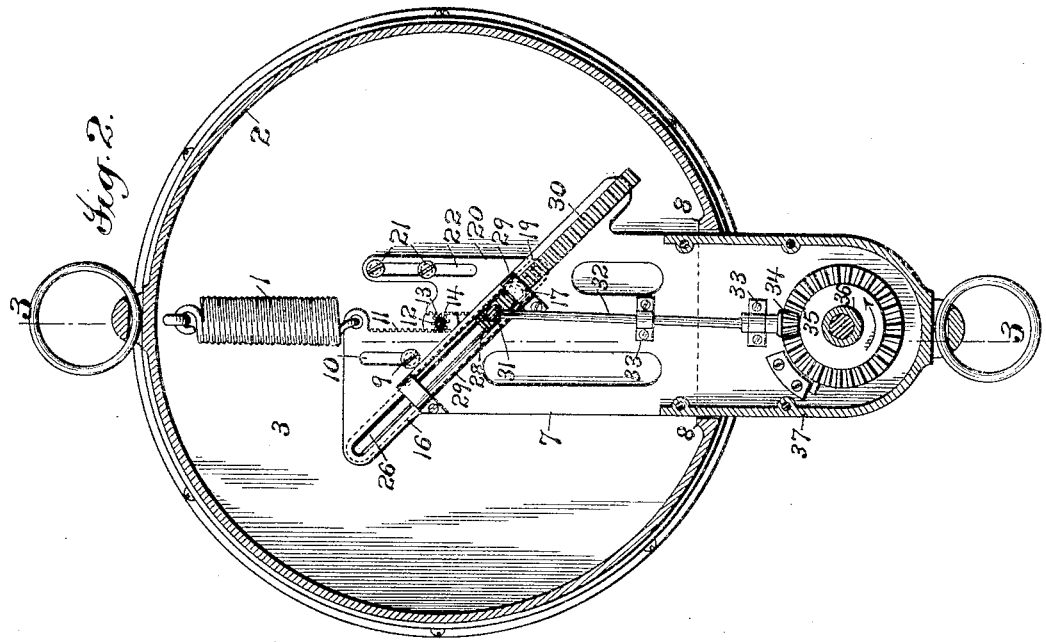
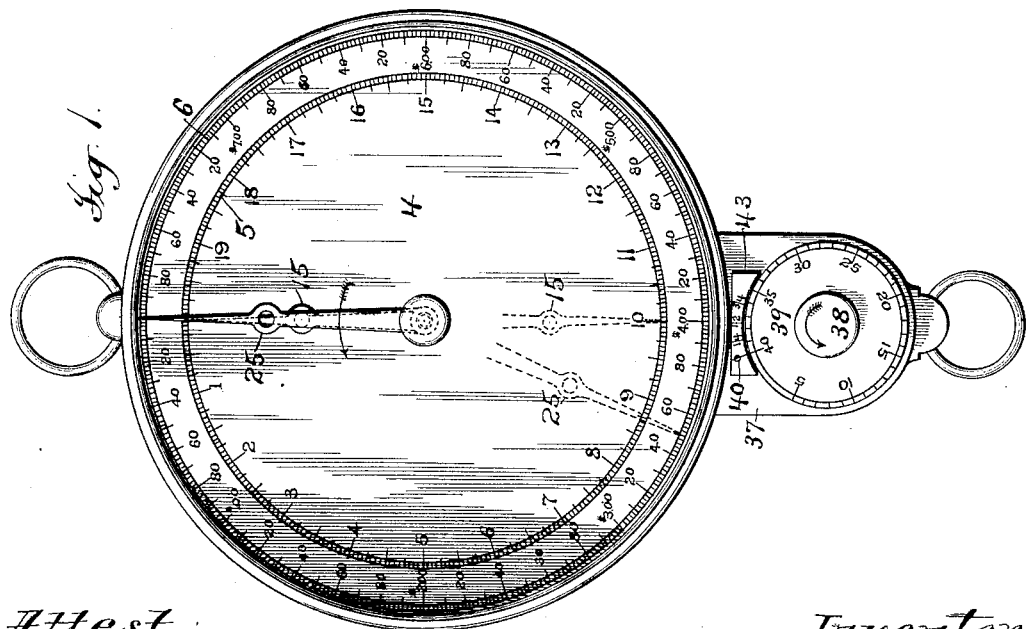
Attest:
George H. Botts
G. M. Borst
Inventor
Frederick L. Fuller
by Philipp Immanuel Okeefe
Attys (No Model.) 2 Sheets—Sheet 2.
F. L. FULLER.
PRICE SCALE.
No. 602,658. Patented Apr. 19, 1898.
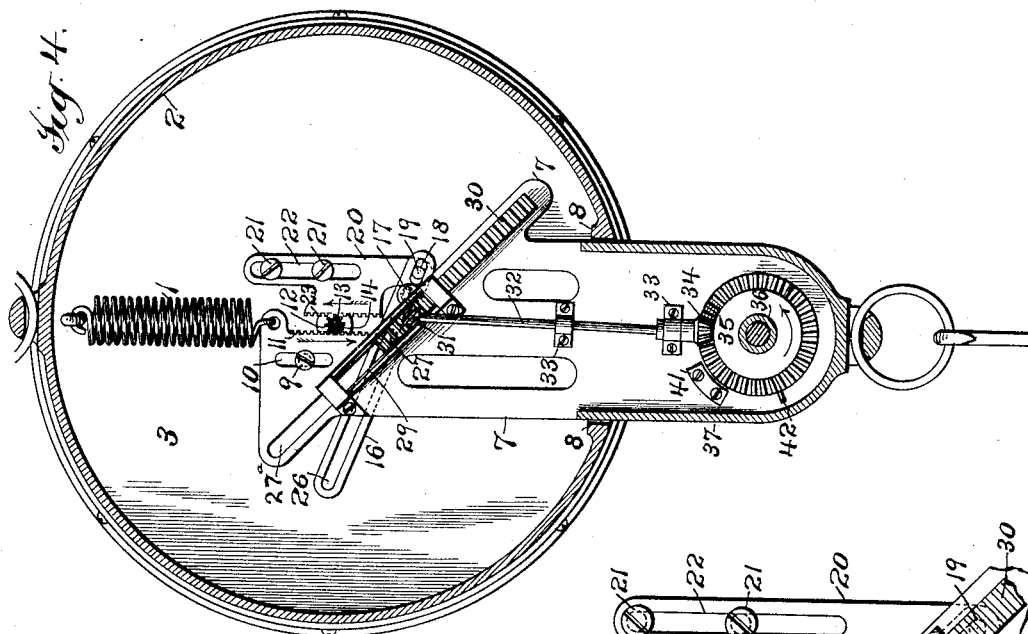
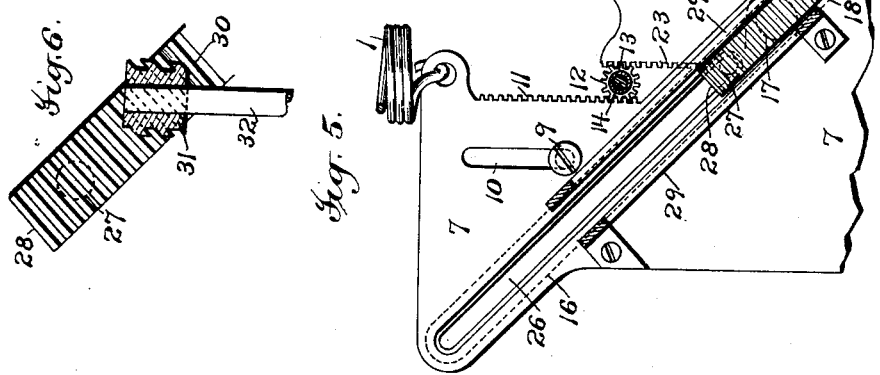
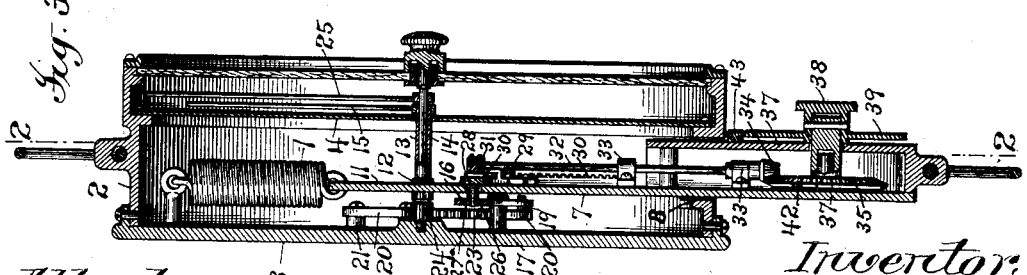
Attest:
George H. Botts
J. M. Dorst
Inventor:
Frederick L. Fuller
by Philipp Mauro & Shuff
Attys

UNITED STATES PATENT OFFICE.

FREDERICK L. FULLER, OF TRENTON, NEW JERSEY.

PRICE-SCALE.

SPECIFICATION forming part of Letters Patent No. 602,658, dated April 19, 1898.

Application filed January 6, 1896. Serial No. 574,457. (No model.)

*To all whom it may concern:*

Be it known that I, FREDERICK L. FULLER, a citizen of the United States, residing at Trenton, county of Mercer, and State of New Jersey, have invented certain new and useful Improvements in Price-Scales, fully described and represented in the following specification and the accompanying drawings, forming a part of the same.

This invention relates to that class of scales known as "computing" or "price" scales, in which, in addition to measuring and indicating the weight of an article, the price or cost thereof is also computed and indicated to the purchaser or dealer, or to both.

Scales of this character with computing mechanism actuated by the weighing mechanism, which in turn received its movement from the article weighed, have heretofore been proposed; but in order to secure accuracy in computing these scales have been of such complicated construction as to be liable, owing to the friction and consequent wear of the many parts necessarily employed in their construction, to become easily deranged and inaccurate, particularly after long-continued use. For these and other reasons, among them the necessarily high cost of the same, due to their complicated construction, scales of this character heretofore devised have been more or less objectionable. It is the object of the present invention to overcome these objections; and to that end the invention consists, briefly, of a computing-scale in which the computing-scale mechanism is actuated by the weighing mechanism through an actuator carried by and moving with the latter, and which actuator is adjustable by means also carried by and moving with the weighing mechanism into position for actuating the computing mechanism in accordance with the unit price of the article weighed.

In the accompanying drawings, in which the invention is shown in what is considered its most preferred form, Figure 1 is a face view of a scale of the "spring-balance" type embodying the present invention. Fig. 2 is a vertical section of the same, taken on the line 2 of Fig. 3. Fig. 3 is a vertical section taken on the line 3 of Fig. 2. Fig. 4 is a view similar to Fig. 2, illustrating the position of the different parts after a weighing and adding operation. Figs. 5 and 6 are details, on an enlarged scale, of the computing mechanism and a portion of the weighing mechanism and the actuator carried thereby for the computing mechanism.

Referring to said drawings, 2 represents the hood or frame of the scale, the rear plate 3 of which has connected to it the working parts of the weighing and computing mechanisms, and the front plate 4 of which is provided with a dial bearing two series 5 6 of graduations representing, respectively, pounds and fractions thereof and dollars and cents.

The weighing mechanism consists of a weighing-rod 7, vertically movable through the hood or casing between shoulders 8 8 and upon a pin 9, secured to the rear plate 3 and entering a vertical slot 10 in the weighing-rod 7. The weighing-rod is suspended from the rear plate 3 by a spring 1, secured to the back plate at one end and connected to the weighing-rod at the other, which spring holds the weighing-rod in its normal or elevated position, as shown in Fig. 2, in the usual manner. The weighing-rod is provided with a rack 11, which engages a pinion 12 upon the inner end of a sleeve 13, mounted upon a spindle 14, the outer end of the sleeve being provided with a pointer 15, coacting with the index 5. The lower end of the weighing-bar is provided with the usual ring or hook from which the article to be weighed is suspended. When the weighing-rod descends under the weight of the article being weighed, the rack 11, engaging the pinion 12, will rotate the latter and through it the weight-pointer 15, which when the weighing-rod comes to rest will indicate upon the index 5 in pounds and fractions thereof the weight of the article suspended from the rod.

The computing mechanism consists of a lever 16, fulcrumed at 17 to the rear plate of the hood or frame, the shorter end of which lever is provided with a slot 18, which receives a pin 19 on the lower end of a vertically-sliding bar 20, the movement of which is guided by pins 21, entering a vertical slot 22 in said bar. The bar 20 is provided with a rack 23, which engages a pinion 24 upon the inner end of the spindle 14, the outer end of which spindle is provided with a pointer 25, which coacts with the price-index 6. The lever 16 is, as will be observed by reference to the drawings, inclined and arranged transversely and in close proximity to the weighing-rod 7, its longer end being provided with a longitudinal slot 26, which receives a pin 27 upon the inner face of a bar 28, carried by the weighing-rod and projecting through a slot 27ª, parallel with lever 16 in the weighing-rod 7, so that as the weighing-rod descends or ascends the lever 16 is correspondingly rocked on its fulcrum by the pin 27, and as the rod 7 descends raises and lowers the sliding rack-bar 20 and, through it and the pinion 24, rotates the price-pointer 25 over the face of the price-index 6 to indicate the total cost or price of the article weighed simultaneously with the indication of the weight of the latter, and as the weighing-rod is retracted by the spring 11 after the removal of the article weighed from the scale rotates the pinion back to zero position.

It is of course necessary that means be provided for the purpose of adjusting the actuating-pin 27 with relation to the lever 16, so as to increase or decrease the extent of movement of the sliding rack-bar 20 in accordance with the unit price of the article weighed. A novel construction and arrangement of mechanism for this purpose is shown in the drawings, which will now be described. For the purpose of permitting such adjustment of the pin 27 the bar 28, which carries said pin, is adapted to slide between guides 29 on the face of the weighing-rod 7 in a direction parallel to the lever 16 in the normal position of the latter, and said bar 28 is provided on its outer face with a rack 30, which is engaged by a worm 31 upon the upper end of a rod 32, journaled in bearings 33 of the weighing-rod, which rod 32 is provided at its lower end with a bevel-pinion 34, engaged by a bevel-wheel 35, journaled on a stud in the weighing-rod and provided with a sleeve 36, extending through a casing 37, provided at the lower end of the weighing-rod, as shown in Fig. 3. Outside the casing the sleeve 36 has pinned to it a thumb-piece 38, by which said sleeve and the bevel-wheel 35 may be rotated, and is also provided with a dial 39, rotating with the sleeve and bearing graduations representing units of price per pound or other unit of weight. The dial 39 makes its indication at the point "40," as shown in Fig. 1, the dial and the bevel-wheel 35 being brought to rest in adjusting the actuating-pin 27, when the graduation on the dial representing the unit price of the article to be weighed registers with the point "40."

The operation is as follows: The capacity of the computing mechanism shown in the drawings is limited to articles the unit prices whereof are between five and forty cents, (but this may be increased or decreased, as desired,) and in the position in which the actuating-pin 27 is shown in the different figures of the drawings the said pin is set for actuating the lever 16 and the remainder of the computing mechanism in accordance with a unit price of forty cents. If we assume, therefore, the weight of the article the unit price whereof is forty cents to be ten pounds, when the weighing-rod is depressed by the weight of the article it will rotate the weight-pointer 15 in the usual way to the numeral "10," and the pin 27, engaging the lever 16, will simultaneously rock the longer end of the latter downward, as shown in Fig. 4, and move the rack-bar 20 upwardly and, through the latter, rotate the price-pointer 25 until said pointer comes opposite the graduation on dial 6 representing "$4.00," which position it will reach simultaneously with the arrival of the weight-pointer 15 at the numeral "10." The weight and cost, together with the unit price of the article weighed, will thus be indicated simultaneously. If the unit price of the next article to be weighed be thirty-five cents, the dial 39, and with it the bevel-wheel 35, will be rotated in the direction of the arrow in Figs. 1 to 3 until the numeral "35" registers with the point "40." As the bevel-wheel is thus rotated it will, through the pinion 34, rotate the worm 31, which in turn engaging the rack 30 will move the rack-bar 28 upwardly, thus moving the pin 27 away from the fulcrum 17 of the lever 16. The computing mechanism will thus be adjusted for operation in accordance with the unit price of thirty-five cents, and if the weight of the article be ten pounds upon the depression of the weighing-rod 7 the weight-pointer 15 will be rotated to the numeral "10," as before, and the pin 27 will rock the lever 16 downwardly a distance slightly less than in the previous operation, and, through the rack and pinion 23 24, rotate the pointer 25 until the graduation representing "$3.50" is reached, when it will come to rest simultaneously with the arrival at the ten-pound graduation of the weight-pointer 15, as shown by dotted lines in Fig. 1. If the unit price of the next article to be weighed be, for example, thirty-seven cents, the direction of movement of the thumb-piece 38 and dial 39 will be reversed—that is, they will be moved from left to right—and if the unit price of the next article be five cents the dial will be turned from right to left, as before, until the numeral "5" comes opposite the point "40," the dial being turned from left to right if the unit price be increased and in the reverse direction if it be decreased.

It is desirable that means be provided for limiting the movement in both directions of the dial and bevel-wheel, so that careless persons may not, by attempting to adjust the scale from a higher to a lower unit price, as from "40" to "5," by turning the dial from left to right, secure a wrong adjustment or strain the parts, and for this purpose I omit graduations between the numerals "5" and "40" on the dial 38 and provide a stop 41, fixed to the weighing-rod 7, which is adapted to engage at both ends a pin 42, fixed on the bevel-wheel 35 opposite the graduation "5." The stop 41 is of a length about equal to the distance between the graduations "40" and "5" on the dial 39, so that when the dial 39 and bevel-wheel 35 are rotated from left to right the pin 42 will engage one end of the stop 41 when the numeral "5" registers with the point "40," and when rotated in the opposite direction will engage its other end when the graduation "40" comes opposite the point "40," the movement of the bevel-wheel and dial being thus positively limited.

The graduations on the dial 39 represent cents only, and as it may be desirable to capacitate the scale for fraction units of value in addition I provide a fractional or vernier index 43, fixed to the casing 37 and bearing three graduations representing, respectively, one-fourth, one-half, and three-fourths of a cent, the "¼" graduation being distanced from the point "40" one and one-fourth spaces or the "½" graduation two and one-half such spaces or graduations on the dial 39 and the "¾" graduation three and three-fourths such spaces or graduations, so that when it is desired to set the pin 27 to actuate the computing mechanism in accordance with a unit price of, say, ten and one-fourth cents the dial 39 will be brought to rest with the graduation "9" opposite the "¼" mark. If the price be ten and one-half cents, the dial will be brought to rest with the graduation "8" opposite the "½" mark, and if the price be ten and three-fourths cents it will be brought to rest with the graduation "7" opposite the "¾" mark.

What I claim is—

1. In a scale, the combination with weighing mechanism, of a computing mechanism including a lever fulcrumed in the scale-frame, an actuator engaging said lever carried by and moving with the weighing mechanism, and means also carried by and moving with the weighing mechanism for adjusting said actuator, substantially as described.

2. In a scale, the combination with weighing mechanism, of a computing mechanism including a lever fulcrumed on the scale-frame, an actuator engaging said lever carried by and moving with the weighing mechanism, and means also carried by and moving with the weighing mechanism for adjusting said actuator along the lever to and from its fulcrum, substantially as described.

3. In a scale, the combination with weighing mechanism, of a computing mechanism including a lever fulcrumed in the scale-frame, said lever being upwardly inclined in the normal position of the weighing mechanism, an actuator engaging said lever carried by and moving with the weighing mechanism, and means also carried by and moving with the weighing mechanism for adjusting said actuator along the lever to and from its fulcrum, substantially as described.

4. In a scale, the combination with weighing mechanism including a rectilinearly-movable member, of a computing mechanism including a lever fulcrumed in the scale-frame, and an adjustable actuator therefor bodily mounted upon and movable with the rectilinearly-movable member, substantially as described.

5. In a scale, the combination with weighing mechanism including a rectilinearly-movable member, of a computing mechanism including a lever fulcrumed in the scale-frame, an adjustable actuator therefor bodily mounted upon and movable with the rectilinearly-movable member, and means for adjusting said actuator along the lever to and from its fulcrum, substantially as described.

6. In a scale, the combination with weighing mechanism, of a computing mechanism including a lever fulcrumed in the scale-frame, an actuating-pin engaging said lever carried by and moving with the weighing mechanism, and means also carried by and moving with the weighing mechanism for adjusting said actuating-pin along the lever to and from its fulcrum, substantially as described.

7. In a scale, the combination with weighing mechanism, of a computing mechanism including a lever fulcrumed on the scale-frame, said lever being upwardly inclined in the normal position of the weighing mechanism, an actuating-pin engaging said lever carried by and moving with the weighing mechanism, and means also carried by and moving with the weighing mechanism for adjusting said actuating-pin along the lever to and from its fulcrum, substantially as described.

8. In a scale, the combination with weighing mechanism, of a computing mechanism, an actuating-pin therefor carried by and moving with the weighing mechanism, and means also carried by and moving with the weighing mechanism for adjusting said actuating-pin, substantially as described.

9. In a scale, the combination with weighing mechanism, of a computing mechanism, an actuating-pin therefor carried by and moving with the weighing mechanism and means also carried by and moving with the weighing mechanism for adjusting said actuating-pin transversely to the line of movement of the weighing mechanism, substantially as described.

10. In a scale, the combination with weighing mechanism, of a computing mechanism including a lever fulcrumed in the scale-frame, a rack-bar carried by and moving with the weighing mechanism, said rack-bar being parallel with said lever in the normal position of the weighing mechanism, an actuating-pin carried by the rack-bar engaging said lever, and gearing for moving said rack-bar logitudinally to adjust the actuating-pin, substantially as described.

11. In a scale, the combination with weighing mechanism, of a computing mechanism including a lever fulcrumed in the scale-frame, a rack-bar carried by and moving with the weighing mechanism, said rack-bar being parallel with said lever in the normal position of the weighing mechanism, an actuating-pin carried by the rack-bar engaging said lever, and gearing also carried by and moving with the weighing mechanism for moving said rack-bar longitudinally to adjust the actuating-pin, substantially as described.

12. In a scale, the combination with weighing mechanism, of a price-indicator, a rack for rotating the same, a lever fulcrumed in the scale-frame and engaging said rack, an actuator carried by and moving with the weighing mechanism engaging said lever, and means also carried by and moving with the weighing mechanism for adjusting said actuator, substantially as described.

13. In a scale, the combination with weighing mechanism, of a price-indicator, a rack for rotating the same, a lever fulcrumed in the scale-frame engaging said rack, an actuator carried by and moving with the weighing mechanism engaging said lever, and means also carried by and moving with the weighing mechanism for adjusting said actuator along the lever to and from its fulcrum, substantially as described.

14. The combination with a computing mechanism, of rod 7, rack-bar 28 sliding on and carried by said rod, actuator 27 carried by said rack-bar and engaging the computing mechanism, and gearing carried by rod 7 for rotating the worm, substantially as described.

In testimony whereof I have hereunto set my hand in the presence of two subscribing witnesses.

FREDERICK L. FULLER.

Witnesses:
GEO. W. MACPHERSON,
W. HOLTAPGAR.